Patented June 20, 1933

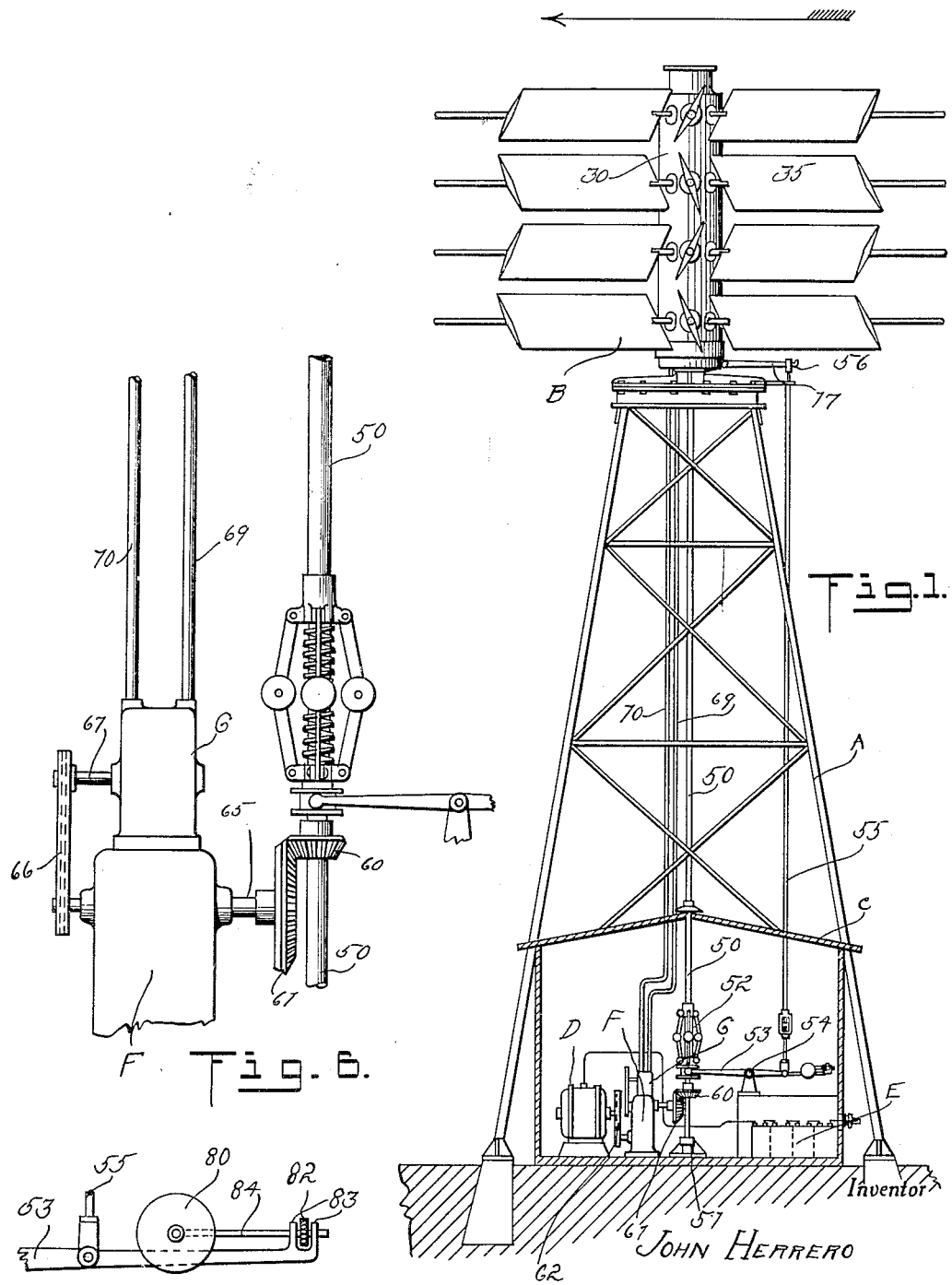

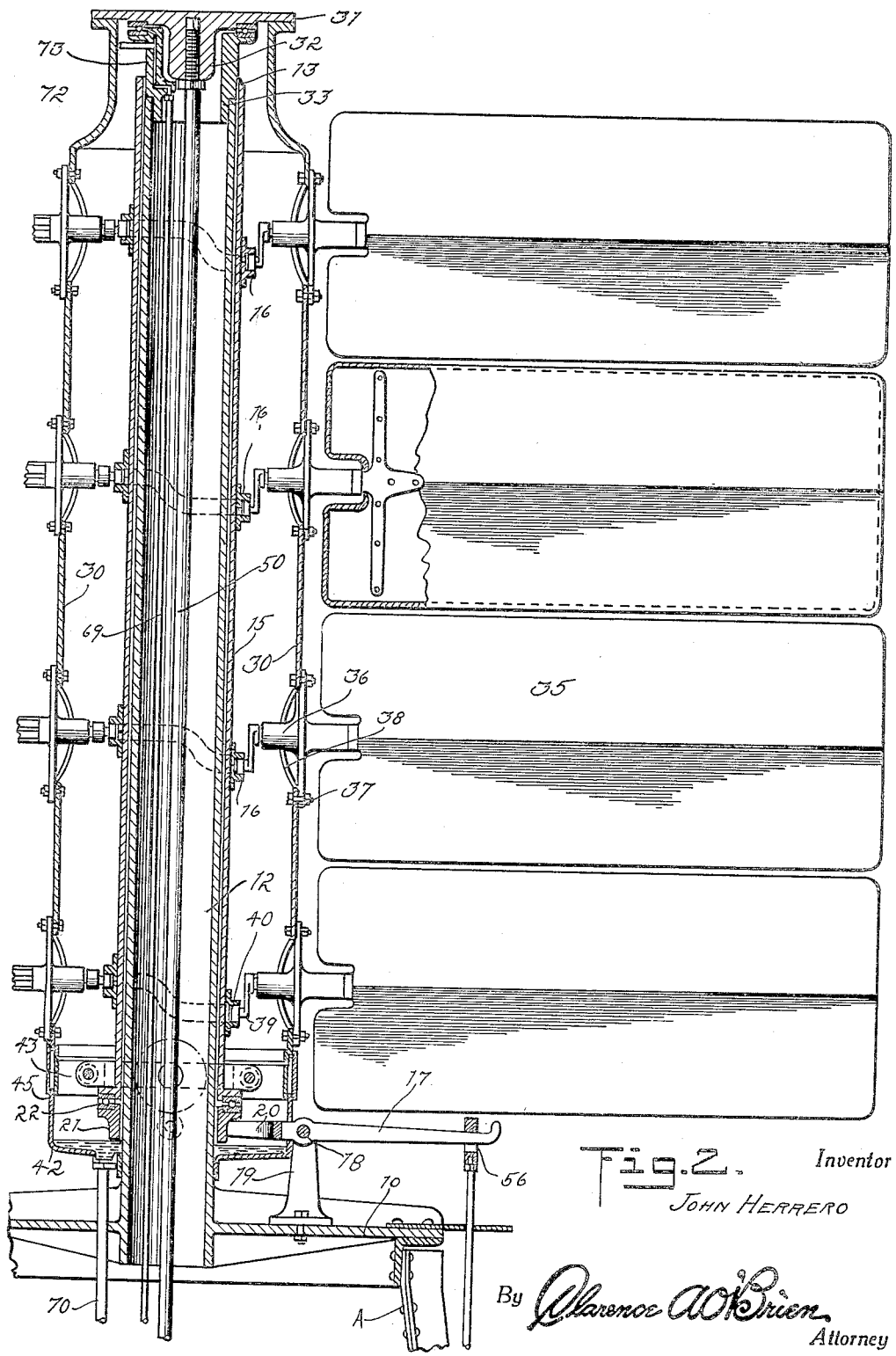

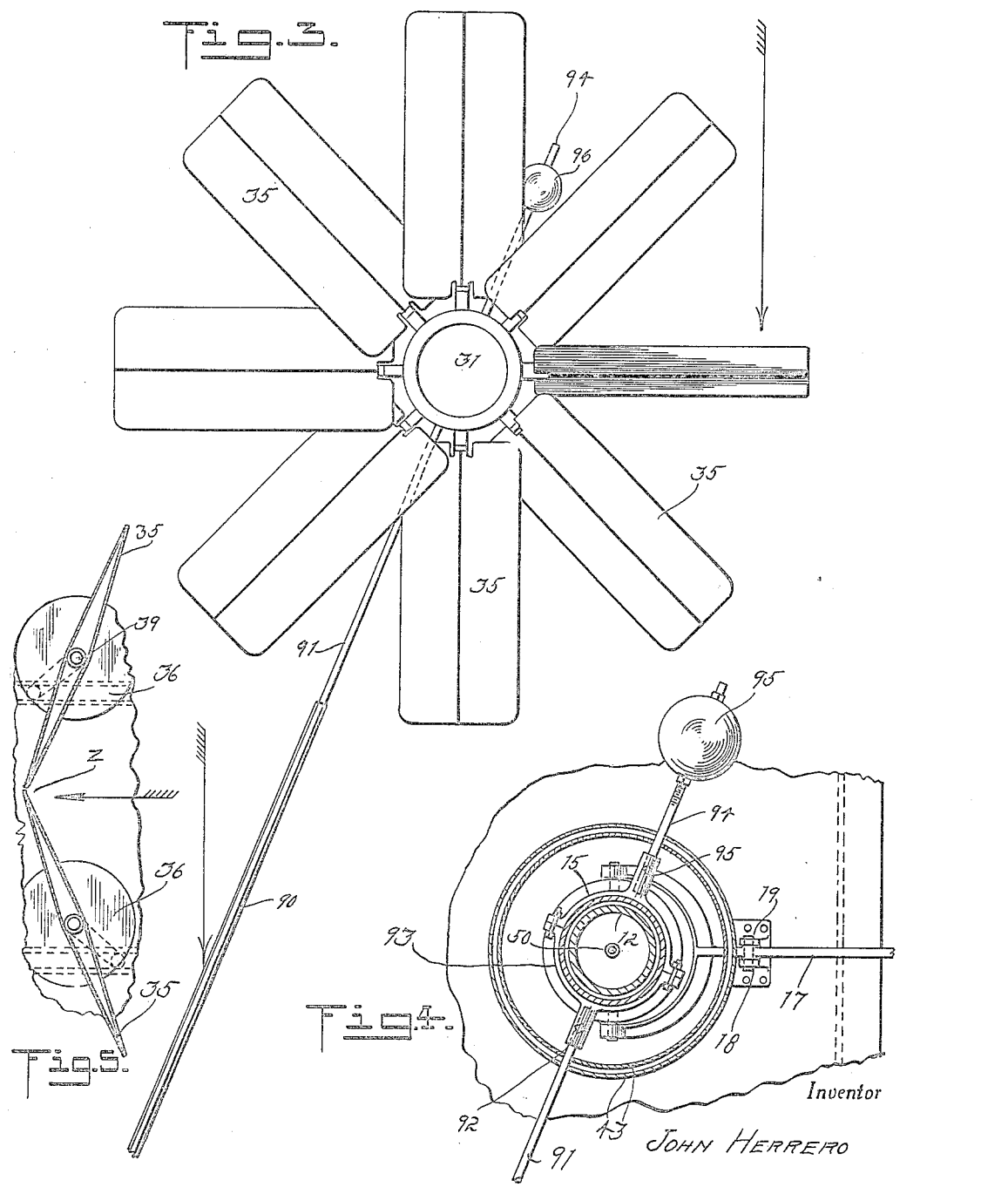

1,914,426

UNITED STATES PATENT OFFICE

JOHN HERRERO, OF BROOKLYN, NEW YORK

WIND MOTOR

Application filed May 22, 1931. Serial No. 539,386.

The present invention relates to a new circular wing capable to act as a propeller for any purpose when applied mechanical power, but in the present invention the circular wing is used as a rotor, or in this particular drawing the circular wing is applied to a wind motor.

It is one of the objects of the present invention so to construct a wind motor that greater power can be generated thereby than is the case with wind motors as ordinarily constructed.

It is a further object of the invention to provide a new and novel form of rotor for wind motors which rotor has a plurality of blades which are adapted to be feathered when entering the wind, and operated to form air receiving pockets for trapping the wind when positioned in the path thereof.

It is a further object of the invention to provide a wind motor which may be rendered operative and inoperative by means of a novel construction for positioning the blades with respect to the wind.

It is a further object of the invention so to construct the rotor of the wind motor that it may be rendered inoperative in an automatic manner when the speed of rotation of the rotor has increased beyond a predetermined point.

A still further object of the invention resides in a new and improved form of lubricating means whereby the lubricant will be supplied to the moving parts of the rotor in varying quantities or at a varying rate depending upon the speed of operation of the rotor.

With the above and other objects in view, reference will be had to the accompanying drawings, in which;

Figure 1 is a view in elevation of a wind motor constructed in accordance with the present invention, using the circular wing in a horizontal position, Figure 2 is a vertical sectional view taken through the rotor of the wind motor, the view being taken upon an enlarged scale, Figure 3 is a top plan view of a rotor for wind motors the rotor being constructed in accordance with the present invention, Figure 4 is a transverse sectional view taken through the rotor in a horizontal plane, Figure 5 is a detail sectional view of the circular wing illustrating the manner in which the blades are operated to form wind receiving pockets during the operation of the rotor, Figure 6 is a detail view in elevation on an enlarged scale showing the governor control for the rotor, and the method of driving a lubricant impelling means, and;

Figure 7 is a fragmentary view on an enlarged scale showing a portion of the automatic control of the rotor.

Referring more specifically to the drawings, the reference character A designates a tower which may be of any desired construction and which is employed for supporting the wind motor in elevated position, and B designates the rotor of the wind motor.

The tower A may be provided with a suitable house or the like C in which the several elements which go to make up the power device are housed. Within the housing C, there may be a generator D which is employed to charge batteries or the like E. The ference character F designates a suitable transmission gearing, and G designates a fluid impeller for supplying lubricant to the working parts of the rotor B.

The tower A is provided on its upper end with a suitable platform or the like 10 which forms the support for the rotor B. Projecting vertically from the platform 10, there is a tubular member 12 the upper end 13 of which is open. As illustrated herein, this tubular member 12 is preferably formed as an integral part of the platform 10 although it may be of different construction without departing from the spirit of the invention.

Surrounding the tubular member 12 there is a second tubular member 15, and this tubular member 15 carries a plurality of cam tracks or the like 16 the specific purpose of which will be hereinafter described. This tubular member 15 is preferably mounted for reciprocal movement upon the tubular member 12 and it is also arranged for partial rotary movement thereon. To impart reciprocal movement to the tubular member 15, a lever or the like 17 is provided pivotally mounted as at 18 in a suitable support 19 carried by the platform 10. This lever has a forked end 20 which embraces a bearing member 21 which in turn surrounds the tubular member 12 and upon which the lower end of the tubular member 15 rests, a suitable anti-friction bearing 22 being interposed between the lower end of the tubular member 15 and the bearing member 21.

Thus it will be apparent that as the lever 17 is rocked about its pivotal point 18, the tubular member 15 will be reciprocated upon the tubular member 12.

Surrounding the tubular member 15 and spaced therefrom, there is a tubular member 30 the upper end of which is closed by a suitable cap plate or the like 31. The cap plate 31 has a depending portion 32 which extends into a collar or the like 33 which extends in turn into the open ends of the tubular members 12 and 15.

This tubular member 30, forms a support for the several blades 35 of the rotor and each blade carries a suitable shaft mounted in bearings 36 which in turn are secured by bolts, screws or the like 37 in cutout portions 38 in the tubular member 30. Each shaft carries a crank arm on its inner end and these crank arms are designated 39 in the drawings and each is provided with a roller 40 or the like which travels in its respective cam slot 16 as best illustrated in Figure 2 of the drawings.

The lower end of the tubular member 30 is spaced a considerable distance above the upper edge of a pan like member 42 and such space is covered by a protecting member 43 which extends downwardly inside of the pan like member 42 as indicated at 45 in said Figure 2. As shown this member 43 is formed of inner and outer members spaced apart to receive the upper end of the pan. This construction permits of rotation of the tubular member 30 relative to the pan like member 42 and yet at the same time provides a fluid tight joint between said two members.

The blades 35 of the rotor, extend radially therefrom in a horizontal plane and are arranged in groups or series there being preferably four blades in each group. The groups of blades are superimposed with respect to each other, and the blades in each group operate in conjunction with the blades in an adjacent group to so position the blades as to provide wind receiving pockets Z such as illustrated in Figure 5 of the drawings wherein the upper crank arm is assembled in the cam track in front of the blade and the lower crank arm back of the blade, that is opposite to each other but travelling in the same direction.

The operation of the several blades 35 is so timed that the wind receiving pockets Z heretofore mentioned will be formed when the blades pass into the path of the wind during rotation of the rotor, and that the pocket will open up or the blade be presented to the wind when rotating thereinto in a feathering or edgewise manner thus offering but little resistance to movement of the blades into the wind.

In the present illustration of the invention, there has been illustrated four groups or series of radially extending blades but it is to be understood that the invention is not limited to any specific number of blades in a group or groups of blades, and that any equal number of series of blades may be employed without departing from the spirit of the invention.

As thus far described, the device operates in the following manner:—

The pivoted lever 17 being operated to adjust the tubular member 15 and its cam tracks 16 so that certain of the blades in the path of the wind will be so positioned that the edges of the adjacent blades will substantially meet and form pockets Z for receiving the wind to impart power to the rotor. As the rotor operates under the influence of the wind, the rollers 40 of the crank shafts of the several blades follow the cam tracks 16 and thus rotate the blades about their own longitudinal axis to cause them to turn into a flat position in such a manner that they will present their edge to the wind upon the opposite side of the rotor from that upon which the pockets Z are formed or as the blades enter the wind. Upon continued rotation of the rotor, the blades will again be positioned so as to form the air pockets Z to trap the air and the foregoing cycle of operation will be repeated as the rotor continues to rotate.

Extending through the tubular member 12, and connected to the cap plate 31 in such a manner as to form a driving connection, there is a shaft or the like 50. This shaft 50 extends downwardly through the tower A and has its lower end mounted in a suitable bearing 51. The shaft 50 carries a suitable governor 52 of the centrifugal type, and said governor is operatively connected with a lever 53 pivotally mounted as at 54 upon a suitable support and connected by means of a suitable rod or the like 55 with the free end of the pivoted lever 17 heretofore mentioned as indicated at 56 in the drawings.

Thus it will be apparent that as the lever 53 is operated by the governor 52, the lever 17 will be correspondingly operated to position the tubular member 15 at a point between its extreme positions, in which position the tracks 16 will be positioned in such a manner that all of the blades will be positioned at an incline to the horizontal so that those blades forming the pockets will be moved away from each other to open the pocket and those blades moving against the wind will offer a resistance to the wind, and thus the movement of the rotor will be checked. By this means it will be apparent that automatic control of the operation of the device is had. The parts may be so adjusted that as the device reaches a predetermined speed the governor will act to so position the several blades of the rotor that no operation thereof will result.

The shaft 50 is provided near its lower end with a bevel gear 60 which in turn meshes with a bevel gear 61 to drive the transmission F, and from the transmission F, the generator D is driven by a suitable chain or like driving connection 62. Thus it will be apparent that as the shaft 50 is rotated under the influence of the rotor, the generator D will be driven to charge the storage batteries E.

The lubricant impeller G heretofore mentioned is driven directly from the shaft 65 upon which the bevel gear 61 is mounted by means of a chain 66 which passes around suitable sprockets, one of which is mounted upon the shaft 67 of the lubricant impeller G, leading from the lubricant impeller G there are two pipes 69 and 70. The pipe 69 forms the means for conveying the lubricant to the upper portion of the tubular members 15 and 12, and is connected to the collar 33 heretofore mentioned as at 72. The collar 33 heretofore mentioned has an oil passage 73 extending therethrough and with which the pipe 69 has communication and by means of which the lubricant is discharged in the upper portion of the tubular member 30. The lubricant trickles downwardly over the several working parts and is collected in the pan like member 42 with which the return pipe 70 heretofore mentioned is connected. By this construction it will be apparent that as the rotor is operating, lubricant will be forced to the several moving parts thereof through the pipe 69, and will be collected in the pan like member 42 and returned therefrom to the lubricant impeller B by way of the pipe 70. By this construction it will be obvious that as the speed of the rotor increases, the speed of the lubricant impeller G will likewise be increased and in this manner the supply of lubricant to the several parts is always increased or decreased as the speed of the rotor increases or decreases thus insuring the proper lubrication of the device.

The speed at which the automatic cut off or blade feathering device operates may be regulated by means of an adjustable weight 80 carried by the outer end of the lever 53 to which the rod 55 heretofore mentioned is connected and this weight may be adjusted by means of a thumb nut or the like 82 mounted between the forks 83 of the end of the lever 53 and operating a shaft 84 suitably connected to the weight 80. Thus as the weight 80 is adjusted near the outer end of the lever, the rotor will be permitted to operate at a lower speed causing a wider opening of the pockets than when the weight is adjusted inwardly of the lever 53.

Means is provided to maintain the rotor at all times during operation in the wind, and this means consists of a vane or the like 90 carried by a rod 91 which as illustrated in Figure 4 of the drawings is connected as at 92 to a collar or the like 93 which surrounds the tubular member 15 and is connected thereto. Upon a diametrically opposite point, a weighted arm 94 is connected to the collar as at 95 and this arm carries an adjustable weight 96 to balance the weight of the vane. By this construction the rotor may be at all times during operation maintained in the wind. The rods 91 and 94 pass through the holes formed in the parts of the member 43 as shown in Fig. 4, so that this member will move with said arms.

From the foregoing, it will be apparent that the present invention provides a new and novel form of wind motor in which greater power is capable of being developed than is the case with wind motors as generally constructed. Furthermore, the present invention provides for automatic operation of the wind motor that is provides means for preventing operation of the wind motor at speeds which would be liable to damage the same. Furthermore, adequate lubrication of the several parts is provided and lubricant is supplied to the several parts automatically corresponding to the speed of the operation of the rotor.

While the circular wing has been herein illustrated as a wind motor in a preferred form, it is to be understood that the invention is not to be limited to the specific construction herein shown, and that it may be constructed in other forms without departing from the spirit thereof.

Having thus described the invention, what is claimed as new and what it is desired to secure by Letters Patent of the United States, is:

1. In a device of the class described, a supporting member, a sleeve supported thereon for longitudinal and rotary movement, cam tracks formed on the exterior of the sleeve and encircling the same, a rotor encircling the sleeve and spaced therefrom, a plurality of annular rows of radiating blades carried by the rotor and supported for rotary movement thereby, a crank arm connected to each blade and having a part engaging one of said cam tracks, said rows of blades being arranged in pairs with crank arms of one pair of blades extending forwardly and the crank arms of the blades of the other pair extending rearwardly, said cam tracks causing the crank arms of each set or pair of blades to position those blades of the two sets travelling with the wind to form V-shaped pockets and to feather the blades travelling against the wind.

2. In a device of the class described, a supporting member, a sleeve encircling the same and supported thereon for rotary and longitudinal movement, cam tracks encircling the exterior part of the sleeve, a cylindrical rotor encircling the sleeve spaced therefrom, a number of annular rows of radiating blades carried by the rotor and each having a shaft at its inner end rotatably supported by the rotor and having a crank arm at its inner end having a part thereon for engaging a cam track, said rows of the blades being arranged in pairs, the crank arms of the blades of one set of each pair extending forwardly and those of the opposite set extending rearwardly, said cam tracks positioning those blades of each pair travelling with the wind to form V-shaped pockets and feathering the other blades travelling against the wind, governor means operated by the rotor for moving the sleeve longitudinally, and a vane connected with the sleeve for rotating the same to keep the device in the wind.

In testimony whereof I affix my signature.

JOHN HERRERO.